(12) United States Patent
Niwa

(10) Patent No.: US 12,038,336 B2
(45) Date of Patent: Jul. 16, 2024

(54) FORCE SENSOR

(71) Applicant: RESEARCH INSTITUTE FOR ELECTROMAGNETIC MATERIALS, Tomiya (JP)

(72) Inventor: Eiji Niwa, Tomiya (JP)

(73) Assignee: Research Institute for Electromagnetic Materials, Miyagi (JP)

( * ) Notice: Subject to any disclaimer, the term of this patent is extended or adjusted under 35 U.S.C. 154(b) by 368 days.

(21) Appl. No.: 17/438,509

(22) PCT Filed: Mar. 10, 2020

(86) PCT No.: PCT/JP2020/010205
§ 371 (c)(1),
(2) Date: Sep. 13, 2021

(87) PCT Pub. No.: WO2020/189400
PCT Pub. Date: Sep. 24, 2020

(65) Prior Publication Data
US 2022/0146343 A1    May 12, 2022

(30) Foreign Application Priority Data

Mar. 19, 2019 (JP) ................................. 2019-051968

(51) Int. Cl.
*G01L 1/22* (2006.01)
(52) U.S. Cl.
CPC .................................. *G01L 1/2287* (2013.01)
(58) Field of Classification Search
CPC ......... G01L 1/225; G01L 1/2206; G01L 5/10; G01L 5/226; G01L 5/0076; G01L 5/00; G01L 5/0028; G01L 5/0038; G01L 5/136; G01L 1/00; G01L 1/18; G01L 1/243; G01L 1/26; G01L 5/16; G01L 25/00; G01L 5/0019; G01L 5/1627; G01L 9/04; G01L 23/18; G01L 1/22; G01L 1/2212;
(Continued)

(56) References Cited

U.S. PATENT DOCUMENTS

2013/0263679 A1* 10/2013 Niemeyer, III ........... G01L 1/04
73/862.636

FOREIGN PATENT DOCUMENTS

JP      2006-170352 A    6/2006
JP      2016-151531 A    8/2016
(Continued)

*Primary Examiner* — John Fitzgerald
*Assistant Examiner* — Truong D Phan
(74) *Attorney, Agent, or Firm* — Carrier, Shende & Associates P.C.; Joseph P. Carrier; Jeffrey T. Gedeon

(57) ABSTRACT

Provided is a force sensor capable of expanding the application range of an electrically conductive member having an isotropic gauge factor. The electrically conductive member is placed in a designated latitude region on a main face of the strain body to annularly extend around a pole and to be divided at a position. The designated latitude region is a latitude region in which the magnitude of the sum of a first strain amount in the longitude line direction of the strain body relative to the pole and a second strain amount in the latitude line direction is not less than a reference value when a force having a component in the perpendicular direction to the main face is applied to the strain body.

5 Claims, 13 Drawing Sheets

(58) Field of Classification Search
CPC ......... G01L 3/108; G01L 3/1457; G01L 1/04; G01L 1/2231; G01L 1/2287; G01L 1/2262; G01B 7/16; G01B 7/20; G01B 5/30; G01G 3/1408; G01G 3/1402; G01G 3/1404; H01H 2239/052
See application file for complete search history.

(56) References Cited

FOREIGN PATENT DOCUMENTS

| | | |
|---|---|---|
| JP | 6084393 B2 | 2/2017 |
| JP | 2018-091705 A | 6/2018 |
| JP | 2018-091848 A | 6/2018 |

\* cited by examiner

FORCE SENSOR

TECHNICAL FIELD

The present invention relates to a force sensor including an electrically conductive member.

BACKGROUND ART

The inventors of the present invention disclose an electrically conductive member including a Cr base thin film containing Cr and inevitable impurities or a Cr base thin film containing Cr, N, and inevitable impurities (see Patent Literature 1).

In the electrically conductive member, a sensing portion is placed such that the longitudinal direction thereof as the flowing direction of measurement current is perpendicular to the strain direction of an object. The electrically conductive member has substantially the same gauge factor (3 or more) as that when a sensing portion is placed such that the longitudinal direction thereof as the flowing direction of measurement current is parallel to the strain direction of an object. In other words, the electrically conductive member has an isotropic gauge factor. In addition, the inventors of the present invention disclose electrically conductive members including a Cr base thin film containing Cr and Mn, including a Cr base thin film containing Cr and Al, and including a Cr base thin film containing Cr, Al, and N (see Patent Literatures 2 and 3).

CITATION LIST

Patent Literatures

Patent Literature 1: Japanese Patent No. 6084393
Patent Literature 2: Japanese Patent Application Laid-Open No. 2018-091705
Patent Literature 3: Japanese Patent Application Laid-Open No. 2018-091848

SUMMARY OF INVENTION

Technical Problem

The present invention is intended to provide a force sensor capable of expanding the application range of an electrically conductive member having an isotropic gauge factor.

Solution to Problem

A force sensor of the present invention includes a strain body having resiliency or elasticity, a supporting portion supporting the strain body over the entire circumference thereof in a continuous or discrete manner, and an electrically conductive member placed on a main face of the strain body and having an isotropic gauge factor in a direction of the main face. The electrically conductive member is placed on the main face of the strain body to annularly extend around a pole and to be divided at a position, in a designated latitude region in which the magnitude of the sum of a first strain amount in a longitude line direction of the strain body relative to the pole and a second strain amount in a latitude line direction of the strain body is not less than a reference value when a force having a component in the perpendicular direction to the main face is applied to the strain body.

In the force sensor having the above structure, the electrically conductive member is placed on a main face of the strain body having a periphery continuously or discretely supported over the entire circumference by the supporting portion so as to annularly extend and to be divided at a position in a designated latitude region annularly extending around the pole.

When a force is applied to the strain body, the components in the perpendicular direction of strain of the strain body at a pair of positions in a latitude region opposite to each other across the pole have the same polarity, whereas the components in the main face direction of the strain have opposite polarities. At the pair of positions of the electrically conductive member annularly extending around the pole and divided at a position, changes in electrical resistance value depending on the components in the perpendicular direction of strain of the strain body can be piled up, whereas changes in electrical resistance value depending on the components in the main face direction of the strain of the strain body can be offset. Based on a change in electrical resistance value between the end points of the electrically conductive member, the component in the main face direction of the force applied to the strain body can be at least partially eliminated, and the component in the perpendicular direction of the force can be measured.

The designated latitude region is a latitude region in which the magnitude of the sum of a first strain amount in the longitude line direction of the strain body and a second strain amount in the latitude line direction of the strain body is not less than a reference value. The "reference value" may be a numerical value not less than 0.50, such as 0.95, 0.85, 0.75, 0.65, or 0.55 where the maximum value of the magnitude of the sum of the first strain amount in the longitude line direction of the strain body and the second strain amount in the latitude line direction of the strain body is "1". Hence, the change in electrical resistance value between the end points of the electrically conductive member can be increased, and accordingly the measurement accuracy of a component in the perpendicular direction of a force applied to the strain body can be improved.

Each latitude is defined for the corresponding direction, for example, based on the length of a longitude line as a line segment extending in a certain direction from the center point or the center of gravity on the main face of the strain body to the edge of the strain body. Hence, when the main face of a strain body has a shape different from the circular shape, such as an elliptical shape, a rectangular shape, or a polygonal shape (regular hexagon, regular octagon, or regular dodecagon), a plurality of positions that are in different directions and are equally distant from the center point or the center of gravity on the main face may have different latitudes. Even when the main face of a strain body has a circular shape, a designated latitude region may vary with directions according to a supporting manner of the strain body by a supporting portion. For different directions, different reference values may be set.

The strain body preferably has a shape having rotational symmetry about an axis that is parallel to a line perpendicular to the main face and passes through the pole or having mirror symmetry through a plane that is perpendicular to the main face and passes through the pole, the continuous or discrete supporting manner of the strain body over the periphery by the supporting portion preferably has rotational symmetry about the axis or has mirror symmetry through the plane, and the electrically conductive member is preferably placed on the main face of the strain body to have rotational symmetry about the axis or to have mirror symmetry through the plane.

When the electrically conductive member includes a Cr base thin film (deposited film), the electrical resistance of the electrically conductive member is more drastically changed by the degree of change in lattice structure of the electrically conductive member or in band energy structure of carriers (electrons) than by the degree of change in shape by longitudinal strain and lateral strain, and this can further improve the measurement accuracy of a component in the perpendicular direction of a force applied to the strain body.

DESCRIPTION OF EMBODIMENTS

First Embodiment (Structure)

Figure 1:
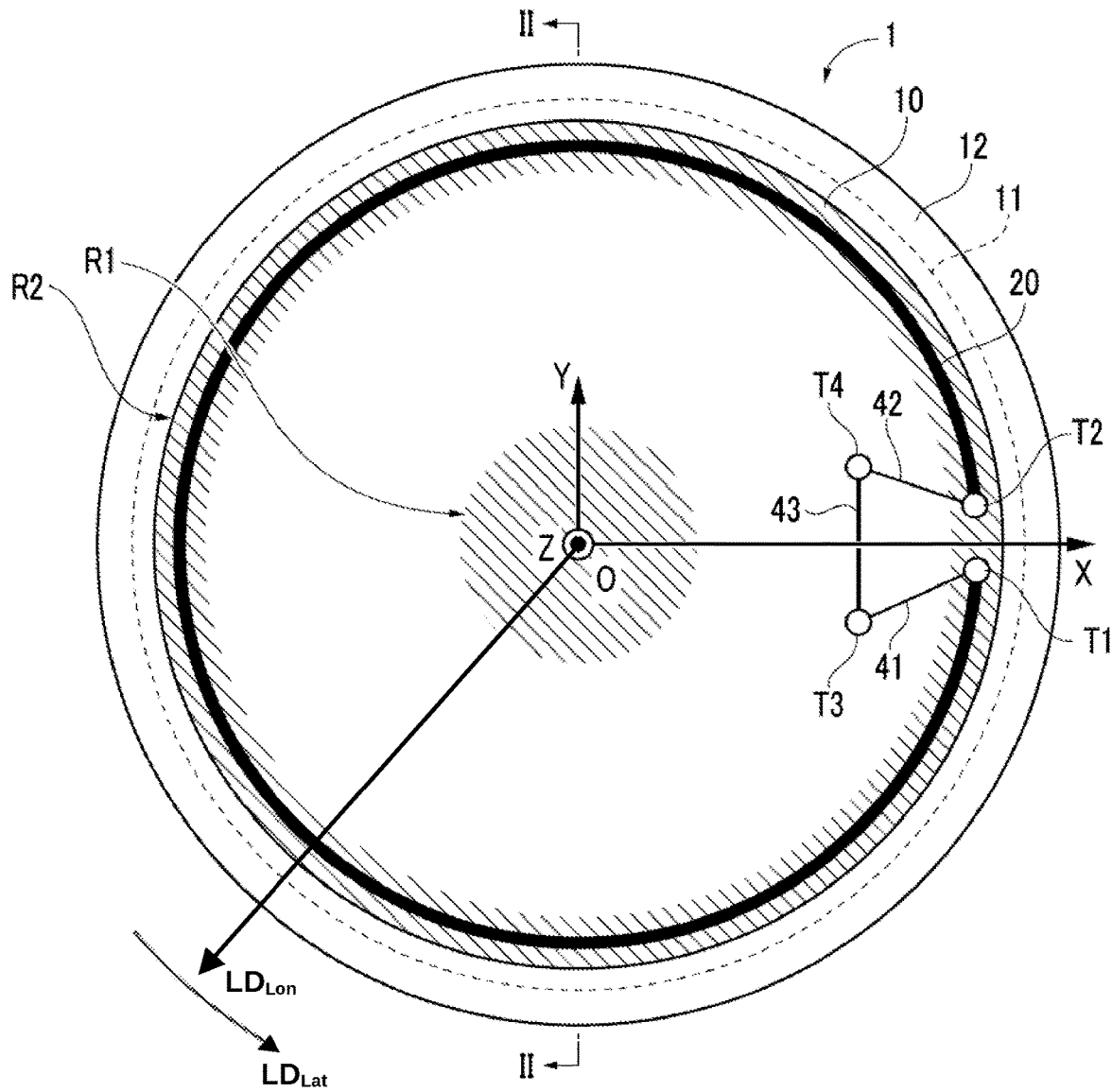
FIG. 1 is a schematic diagram showing the structure of a force sensor as a first embodiment of the present invention.
Figure 2:
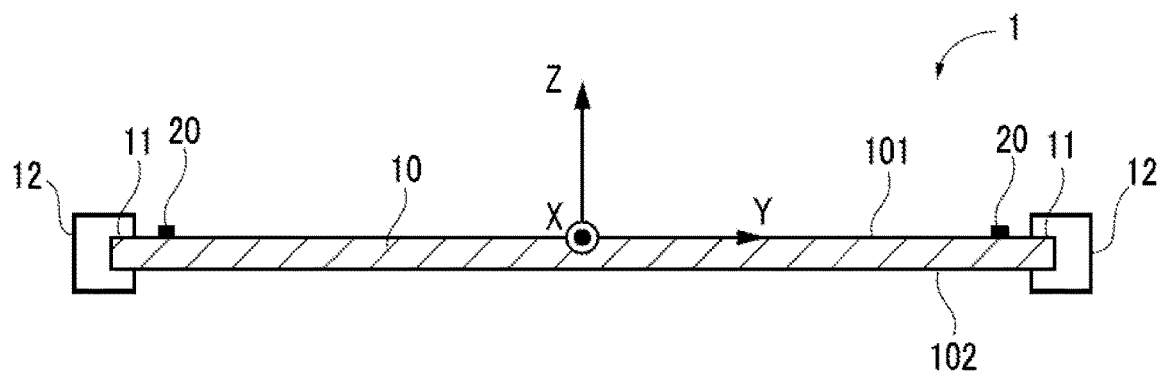
FIG. 2 is a cross-sectional view of the force sensor in FIG. 1 taken along line II-II.

A force sensor as a first embodiment of the present invention shown in FIG. 1 and FIG. 2 includes a strain body 10, an electrically conductive member 20, and conducting wires 41 to 43. To explain positions and postures of components of the force sensor, a three-dimensional orthogonal coordinate system (X, Y, Z) in which the origin is the center point of a top face 101 of the strain body 10 is used.

The strain body 10 is formed to have a substantially disk shape having a thickness direction as the Z-direction and having, as a pair of main faces, the top face 101 and a bottom face 102 that are a pair of main faces substantially parallel to the X-Y plane. The strain body 10 may have a constant thickness or have irregular thicknesses when locally including thin regions, for example. The strain body 10 has a shape having rotational symmetry about the axis (z-axis) that is parallel to a line perpendicular to the top face 101 and passes through a pole O or having mirror symmetry through a plane (for example, x-z plane) that is perpendicular to the top face 101 and passes through the pole O.

The strain body 10 includes, in the peripheral area thereof, an annular protrusion portion 11 extending outward over the entire circumference. The strain body 10 is fixed or supported in the protrusion portion 11 over the entire circumference by a supporting portion 12. The fixing system between the protrusion portion 11 and the supporting portion 12 may be a mechanical fixing system, for example, by bolts and nuts or a fixing system, for example, by adhesion or welding. The protrusion portion 11 and the supporting portion 12 may have an integrally formed structure, for example, by cutting work and/or casting. A continuous supporting manner of the strain body 10 in the peripheral protrusion portion 11 by the supporting portion 12 has rotational symmetry about the axis (that may differ from the above rotational symmetry) or mirror symmetry through the plane.

The strain body 10 is supported in the protrusion portion 11 by the supporting portion 12 as described above, and thus applying force to the strain body 10 generates strain on the strain body 10.

Figure 3:
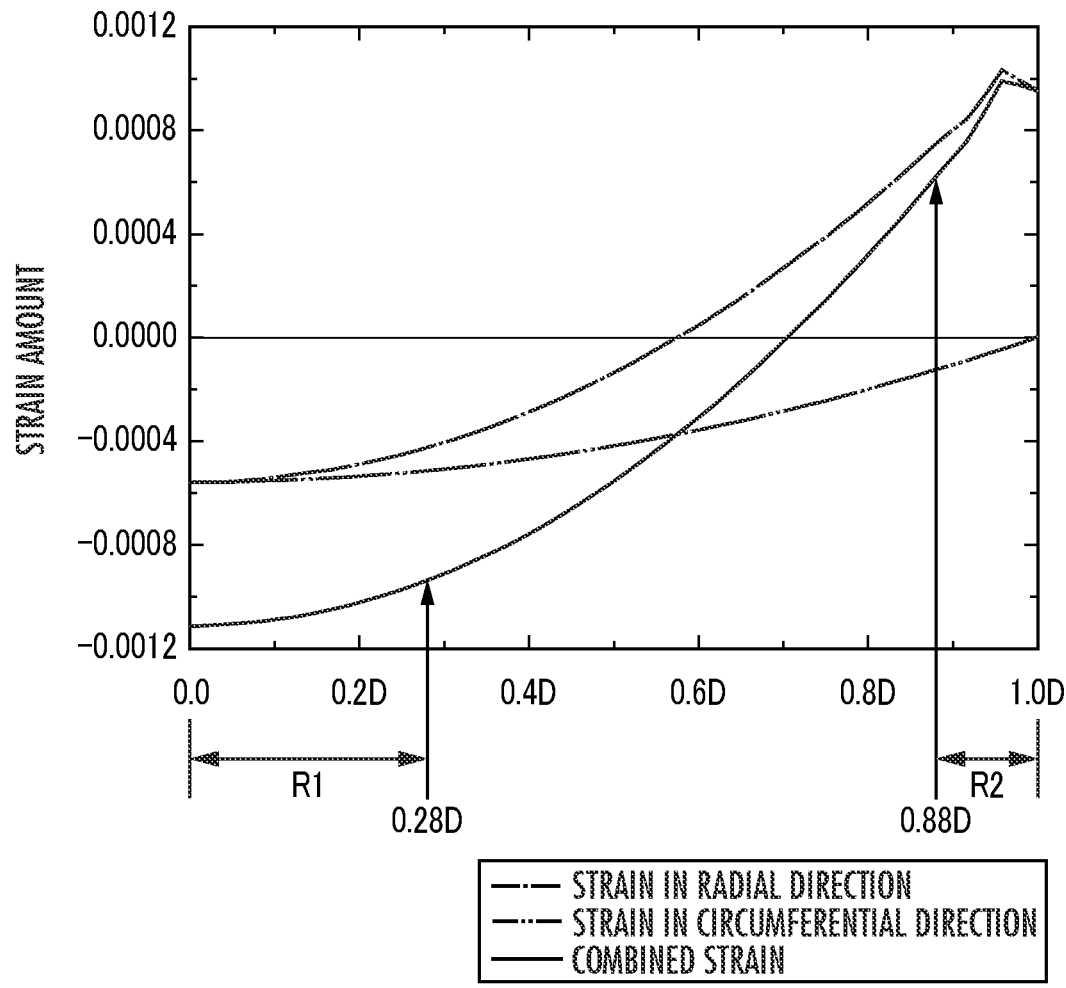
FIG. 3 is a graph of strain amount of the strain body in the first embodiment.

FIG. 3 shows the calculation result of strain characteristics of the strain body 10 when an entirely uniform force is applied to the top face 101 of the strain body 10. The change in "first strain amount" as strain amount of the strain body 10 in the longitude line direction from the pole O to a point fixed by the supporting portion 12 or in the radial direction is indicated by the dot-dash line; the change in "second strain amount" as strain amount of the strain body 10 in the latitude line direction or the circumferential direction is indicated by the dash-dot-dot line; and the sum of them is indicated by the solid line (the same applies to the figures showing calculation results). A "negative" strain amount represents a shrinkage amount of the strain body 10 (exactly, the top face 101 (surface to which a stress is applied)), whereas a "positive" strain amount represents an extension amount of the strain body 10 (the same as above).

In the embodiment, the strain body 10 used was a disk-shaped SUS316L (Young's modulus: 193 GPa, Poisson's ratio: 0.28) having a thickness of 0.1 mm and a radius of 2.5 mm. When a pressure of 0.5 MPa is applied to the strain body 10 in the Z-direction (the thickness direction of the disk), each strain of meshes at 0.1-mm intervals defined by a cylindrical coordinate system (r, θ, z) in which the reference is the center of the strain body 10 is calculated by the finite element method.

When a reference value is set at 80% of the maximum magnitude of the sum (negative value) of a first strain amount and a second strain amount, the magnitude of the sum (negative value) of strain amounts is not less than the reference value in a range not more than a distance of 0.28 D from the pole O where D is the length of the longitude line. When a reference value is set at 95% of the maximum magnitude of the sum of negative strain amounts, the magnitude of the sum (negative value) of a first strain amount and a second strain amount is not less than the reference value in a range not more than a distance of 0.18 D from the pole O.

When a reference value is set at 80% of the maximum magnitude of the sum (positive value) of a first strain amount and a second strain amount, the magnitude of the sum (positive value) of strain amounts is not less than the reference value in a range not less than a distance of 0.88 D from the pole O where D is the length of the longitude line. When a reference value is set at 95% of the maximum magnitude of the sum of positive strain amounts, the magnitude of the sum (positive value) of a first strain amount and a second strain amount is not less than the reference value in a range not less than a distance of 0.92 D from the pole O.

The electrically conductive member 20 is placed in a second designated latitude region R2 not less than a distance of 0.92 D from the pole O along a longitude line from the pole O to a point fixed by the supporting portion 12 so as to extend in a substantially annular manner and to be divided at a position along a latitude line orthogonal to the longitude line. The electrically conductive member 20 is placed on the top face 101 of the strain body 10 so as to have rotational symmetry (which may differ from the above rotational symmetry) about the axis or have mirror symmetry through the plane. The electrically conductive member 20 may be placed so as to be included in a substantially circular, first designated latitude region R1 not more than a distance of 0.18 D from the pole O.

The strain body 10 is formed, for example, from a resilient metal, a synthetic resin, or a combination of them. When the strain body 10 is made from an electrically conductive material such as metal, the top face 101 in at least a region in which the electrically conductive member 20 and the conducting wires 41 to 43 are formed is covered with an insulating thin film. Accordingly, the strain body 10 is electrically insulated from the electrically conductive member 20 and the conducting wires 41 to 43.

The electrically conductive member 20 is formed on the top face 101 of the strain body 10. The electrically conductive member 20 has an isotropic gauge factor (a gauge factor of 3 or more) and is formed, for example, from a Cr thin film containing Cr and inevitable impurities or a Cr—N thin film containing Cr, N, and inevitable impurities disclosed in Patent Literature 1. The Cr—N thin film is, for example, represented by general formula $Cr_{100-x}N_x$, and the composition ratio x is 0.0001≤x≤30 in terms of % by atom.

The electrically conductive member 20 may be formed from a Cr base thin film represented by general formula $Cr_{100-x}Mn_x$ (x is 0.1≤x≤34 in terms of % by atom) or by general formula $Cr_{100-x}Al_x$ (x is 4≤x≤25 in terms of % by atom) (see Patent Literature 2).

The electrically conductive member 20 may be formed from a Cr base thin film represented by general formula $Cr_{100-x-y}Al_xN_y$ (x is 4≤x≤25, and y is 0.1≤y≤20, in terms of % by atom) (see Patent Literature 3). The thin film is formed on the top face 101 of the strain body 10 by sputtering or the like. The Cr—N thin film has an extremely small temperature coefficient of resistance (TCR) (<±50 ppm/° C.) and thus is stable against temperature changes.

One end of the electrically conductive member 20 is connected through a terminal T1, the first conducting wire 41, a terminal T3, the third conducting wire 43, a terminal T4, the second conducting wire 42, and a terminal T2 in sequence to the other end of the electrically conductive member 20.

Figure 4:
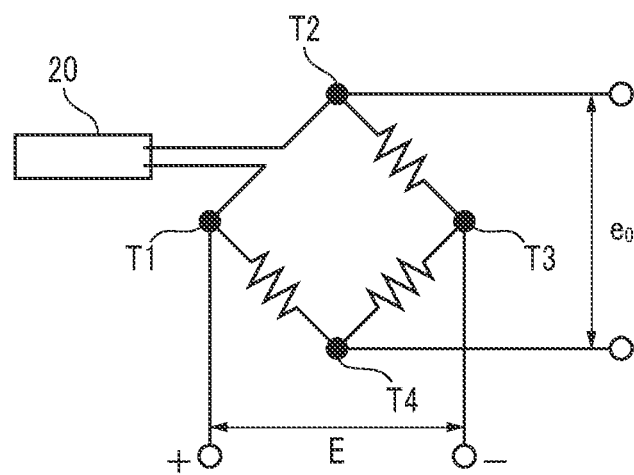
FIG. 4 is an example diagram of a strain detection circuit in the first embodiment.

The conducting wires 41 to 43 form, together with a electrically conductive member 20, a bridge circuit in one-active gauge method (2-wire or 3-wire) (see FIG. 4). The thickness, the width, the length, and electrical properties such as electrical conductivity of the electrically conductive member 20 are appropriately designed from the viewpoint of formation of a bridge circuit (strain detection circuit). The thickness, the width, the length, and the material (determining electrical conductivity) of each of the conducting wires 41 to 43 are appropriately designed from the viewpoint of formation of the bridge circuit as with the electrically conductive member 20.

(Function)

In the force sensor as the first embodiment of the present invention (for example, a fluid pressure sensor), the electrically conductive member is placed on the main face 101 of the strain body 10 having a periphery continuously supported over the entire circumference by the supporting portion 12 so as to annularly extend and to be divided at a position in a designated latitude region annularly extending around the pole O.

Figure 5A:
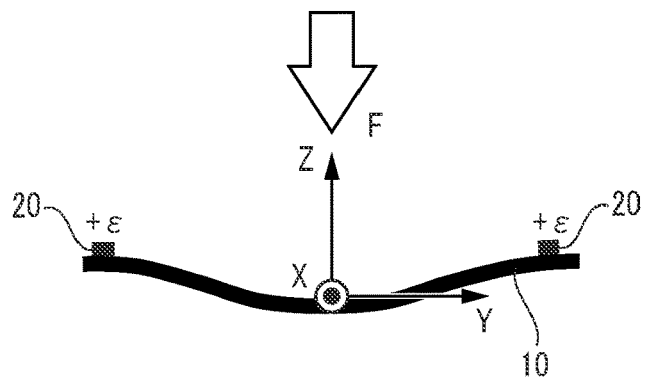
FIG. 5A is a schematic diagram showing a function of the force sensor in response to a first force application mode.
Figure 5B:
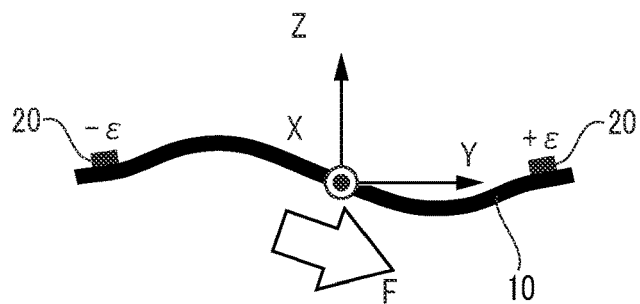
FIG. 5B is a schematic diagram showing a function of the force sensor in response to a second force application mode.
Figure 5C:
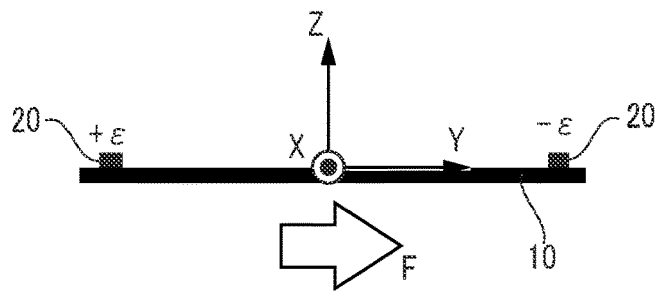
FIG. 5C is a schematic diagram showing a function of the force sensor in response to a third force application mode.

When a force F is applied to the strain body 10, the components in the perpendicular direction of strain of the strain body 10 at a pair of positions in the second designated latitude region R2 (or the first designated latitude region R1) opposite to each other across the pole O have the same polarity (see FIG. 5A). In contrast, the components in the main face direction of the strain of the strain body 10 at the pair of positions have opposite polarities in this case (see FIG. 5B and FIG. 5C).

On this account, at the pair of positions of the annular, electrically conductive member 20 divided at a position, changes in electrical resistance value depending on the components in the perpendicular direction of the strain of the strain body 10 can be piled up, whereas changes in electrical resistance value depending on the components in the main face direction of the strain can be offset. Based on a change in electrical resistance value between the end points of the electrically conductive member 20, the component in the main face direction of the force applied to the strain body 10 can be at least partially eliminated, and the component in the perpendicular direction of the force can be measured.

In addition, the designated latitude region R2 is a latitude region in which the magnitude of the sum of a first strain amount in the longitude line direction of the strain body 10 and a second strain amount in the latitude line direction is not less than a reference value (see FIG. 3). This can increase the change in electrical resistance value between the end points of the electrically conductive member 20 and accordingly can improve the measurement accuracy of a component in the perpendicular direction of a force applied to the strain body 10.

The electrically conductive member 20 is formed from one Cr base thin film of (1) a Cr base thin film containing Cr and inevitable impurities or a Cr base thin film containing Cr, N, and inevitable impurities, (2) a Cr base thin film containing Cr and Mn or a Cr base thin film containing Cr and Al, and (3) a Cr base thin film containing Cr, Al, and N. Hence, the electrical resistance of the electrically conductive member 20 is more drastically changed by the degree of change in lattice structure of the electrically conductive member or in band energy structure of carriers (electrons) than by the degree of change in shape by longitudinal strain and lateral strain, and this can further improve the measurement accuracy of a force applied to the strain body 10.

Second Embodiment (Structure)

Figure 6:
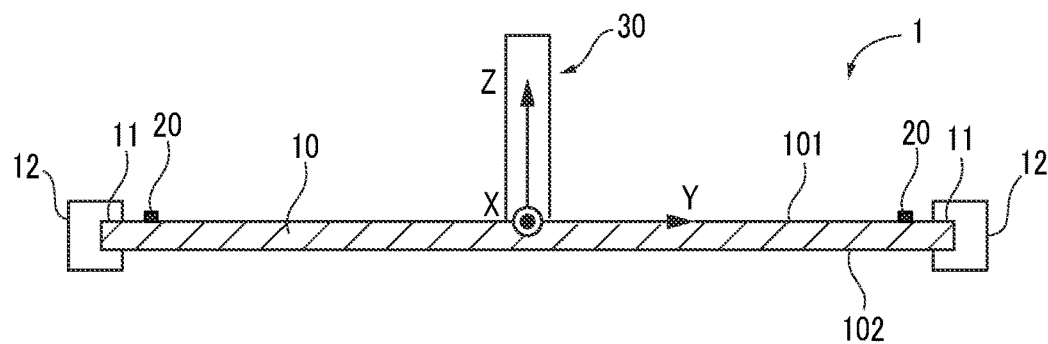
FIG. 6 is a schematic diagram showing the structure of a force sensor as a second embodiment of the present invention.

A force sensor as a second embodiment of the present invention shown FIG. 6 includes a substantially pillar-shaped force transfer member 30 on a top face 101 of a strain body 10 in a reference region (for example, a circular region) having the center as a pole O of the strain body 10. Except this structure, the force sensor as the second embodiment of the present invention has substantially the same structure as the force sensor as the first embodiment of the present invention (see FIG. 1 and FIG. 2), and thus common components are indicated by identical signs and are not described.

In the strain body 10, a recess hollowed in a substantially spherical crown shape may be formed downward from the top face 101, and the force transfer member 30 may have a projection that is projected in a substantially spherical crown shape and is to fit with the recess formed in the top face 101 of the strain body 10. By embedding the projection of the force transfer member 30 in the recess of the strain body 10, the substantially convex contact face of the projection of the force transfer member 30 is in contact with the strain body 10. The end shape of the force transfer member 30 may be modified into various shapes, such as a substantially cylinder shape in which the end edge is chamfered over the entire circumference or a truncated cone shape. In place of contact with the strain body 10, the force transfer member 30 may be mechanically bonded to the strain body 10 by a mechanical system such as a bolt-nut system.

Figure 7:
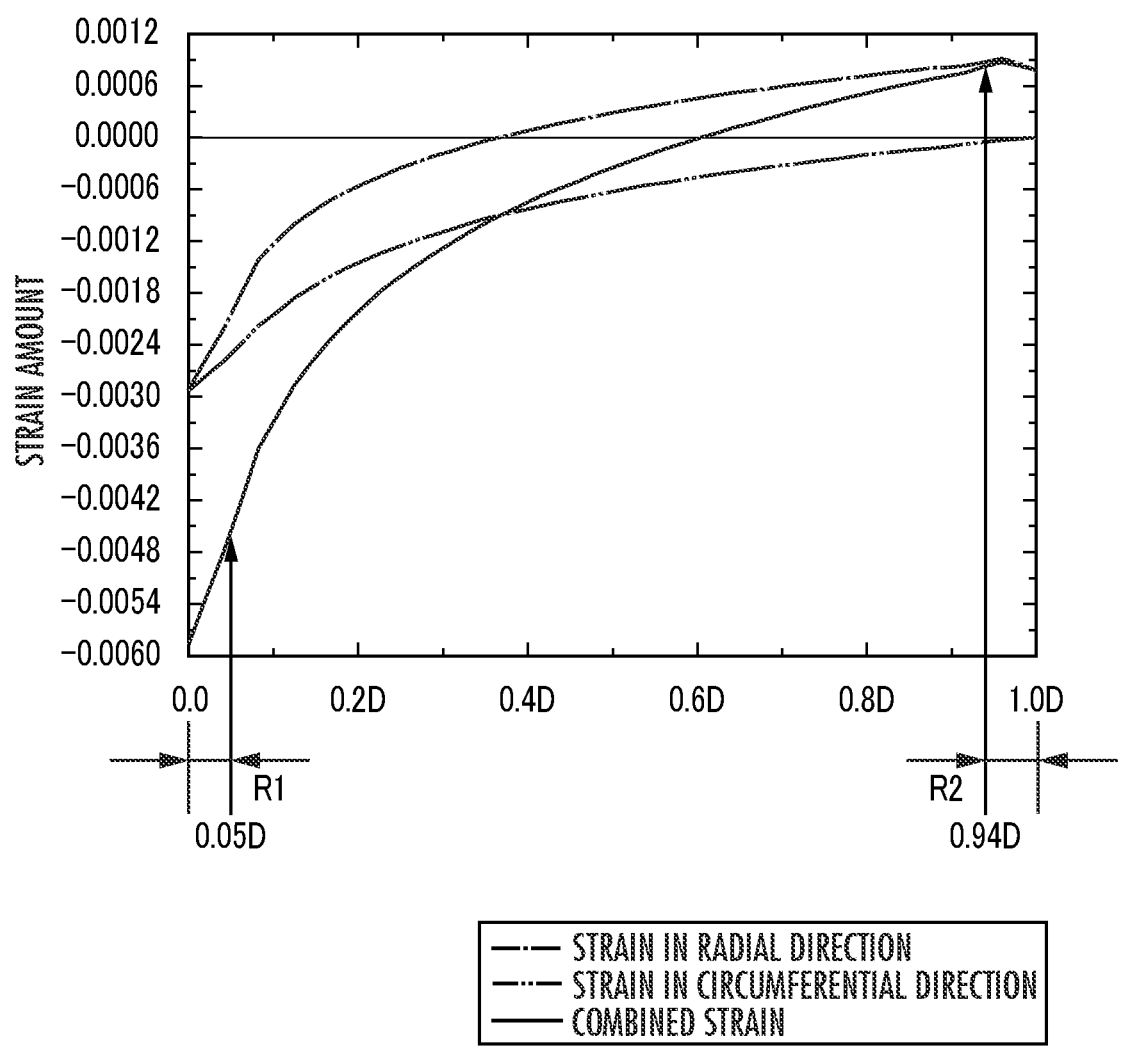
FIG. 7 is a graph of strain amount of the strain body in the second embodiment.

FIG. 7 shows the calculation result of strain characteristics of the strain body 10 when a force is locally applied to a substantially circular reference region having the center as the pole O of the top face 101 of the strain body 10 that has a substantially disk shape and has a periphery continuously supported or restricted over the entire circumference by the supporting portion 12.

In the embodiment, the strain body 10 used was a disk-shaped SUS316L (Young's modulus: 193 GPa, Poisson's ratio: 0.28) having a thickness of 0.1 mm and a radius of 2.5 mm. When a force of 1 N is applied to a micro region including the pole O of the strain body 10 in the Z-direction (the thickness direction of the disk), each strain of meshes at 0.1-mm intervals defined by a cylindrical coordinate system $(r, \theta, z)$ in which the reference is the center of the strain body 10 is calculated by the finite element method.

When a reference value is set at 80% of the maximum magnitude of the sum (negative value) of a first strain amount and a second strain amount, the magnitude of the sum (negative value) of strain amounts is not less than the reference value in a range not more than a distance of 0.05 D from the pole O where D is the length of the longitude line. When a reference value is set at 95% of the maximum magnitude of the sum of negative strain amounts, the magnitude of the sum (negative value) of a first strain amount and a second strain amount is not less than the reference value in a range not more than a distance of 0.03 D from the pole O.

When a reference value is set at 80% of the maximum magnitude of the sum (positive value) of a first strain amount and a second strain amount, the magnitude of the sum (positive value) of strain amounts is not less than the reference value in a range not less than a distance of 0.94 D from the pole O where D is the length of the longitude line. When a reference value is set at 95% of the maximum magnitude of the sum of positive strain amounts, the magnitude of the sum (positive value) of a first strain amount and a second strain amount is not less than the reference value in a range not less than a distance of 0.95 D from the pole O.

The electrically conductive member 20 is placed in a substantially annular, second designated latitude region R2 not less than a distance of 0.94 D along a longitude line from the pole O so as to extend in a substantially annular manner along a latitude line around the pole O and to be divided at a position. The electrically conductive member 20 may be placed in a substantially circular, first designated latitude region R1 not more than a distance of 0.05 D along a longitude line from the pole O so as to extend in a substantially annular manner along a latitude line around the pole O and to be divided at a position.

(Function)

According to the force sensor as the second embodiment of the present invention, the change in electrical resistance value between the end points of the electrically conductive member 20 can be increased, and accordingly the measurement accuracy of a component in the perpendicular direction of a force applied to the strain body 10 can be improved.

Third Embodiment (Structure)

Figure 8:
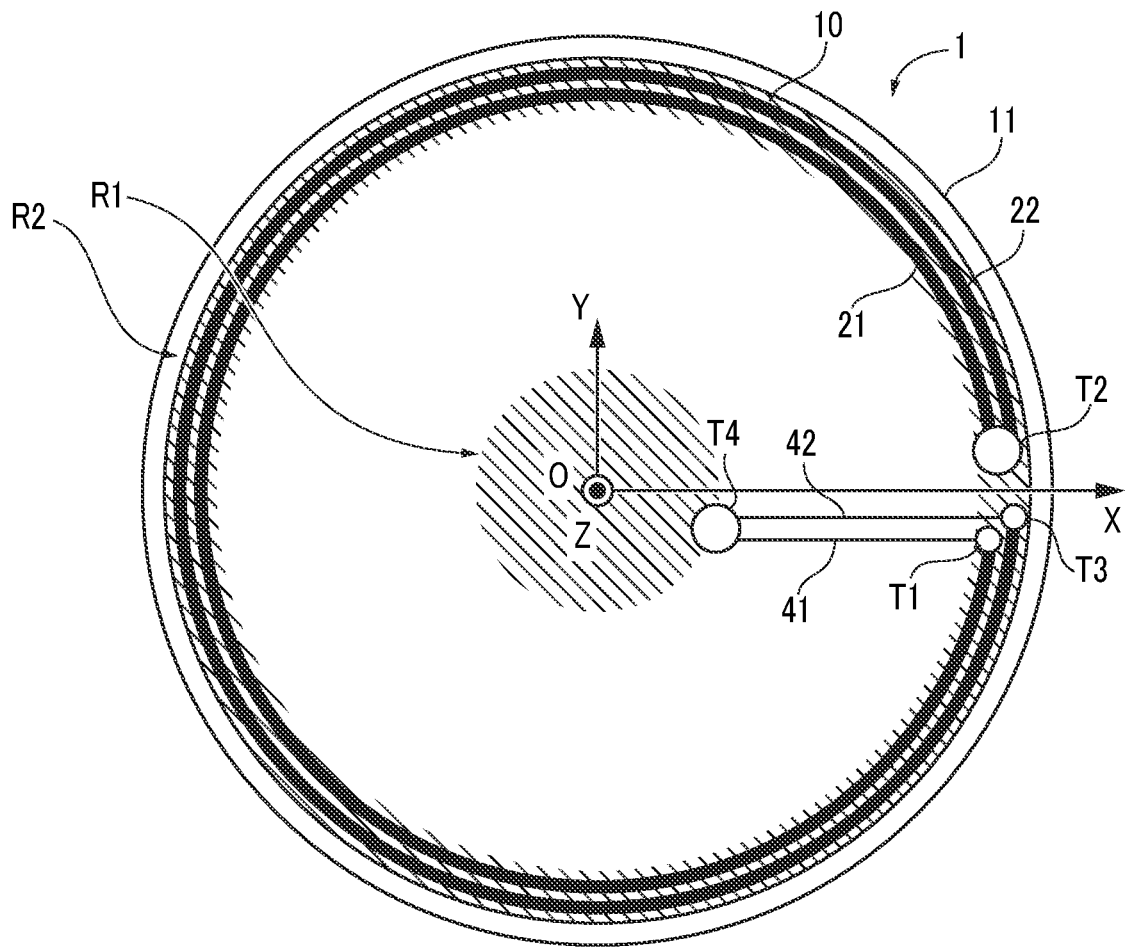
FIG. 8 is a schematic diagram showing the structure of a force sensor as a third embodiment of the present invention.

In a force sensor as a third embodiment of the present invention shown in FIG. 8, a first electrically conductive member 21 and a second electrically conductive member 22 each extending in a substantially annular manner around a reference point or pole O and divided at a position are placed in this order from the inside in a second designated latitude region R2 on a top face 101 of a strain body 10.

The first electrically conductive member 21 is connected at one end through a terminal T1, a first conducting wire 41, and a terminal T4 in sequence to the other end of the second electrically conductive member 22 and is connected at the other end through a terminal T2, a second conducting wire 42, and a terminal T3 in sequence to one end of the second electrically conductive member 22. The second electrically conductive member 22 is connected at one end through the terminal T3, the second conducting wire 42, and the terminal T2 in sequence to the other end of the first electrically conductive member 21 and is connected at the other end through the terminal T4, the first conducting wire 41, and the terminal T1 in sequence to one end of the first electrically conductive member 21.

Figure 9A:
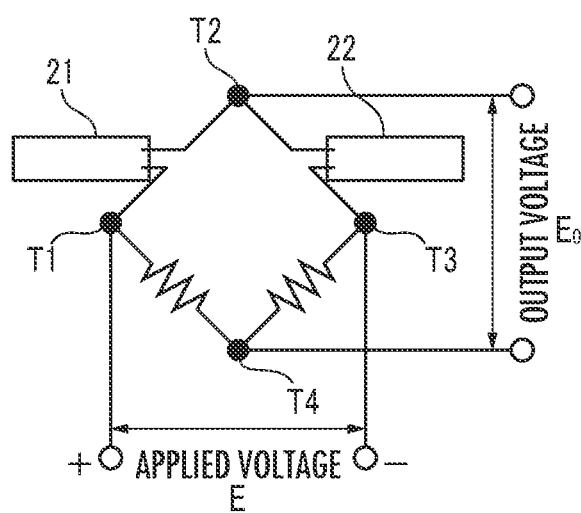
FIG. 9A is a first example diagram of a strain detection circuit in the third embodiment.
Figure 9B:
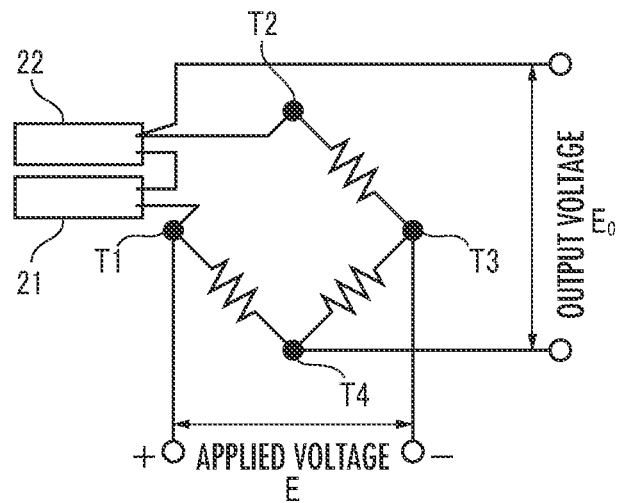
FIG. 9B is a second example diagram of the strain detection circuit in the third embodiment.

The conducting wires 41 and 42 form, together with the first electrically conductive member 21 and the second electrically conductive member 22, a bridge circuit in two-active gauge method (see FIG. 9A). The conducting wires 41 and 42 may form, together with the first electrically conductive member 21 and the second electrically conductive member 22, a bridge circuit in one-active gauge method (series system) (see FIG. 9B).

The thickness, the width, the length, and electrical properties such as electrical conductivity of each of the first electrically conductive member 21 and the second electrically conductive member 22 are appropriately designed from the viewpoint of formation of a bridge circuit (strain detection circuit). The thickness, the width, the length, and the material (determining electrical conductivity) of each of the conducting wires 41 and 42 are appropriately designed from the viewpoint of formation of the bridge circuit as with the first electrically conductive member 21 and the second electrically conductive member 22.

Except the above structure, the force sensor as the third embodiment of the present invention has substantially the same structure as the force sensor as the first embodiment of the present invention (see FIG. 1 and FIG. 2), and thus common components are indicated by identical signs and are not described. The first electrically conductive member 21 and the second electrically conductive member 22 are each formed from a Cr base thin film as with the electrically conductive member 20 in the first embodiment.

(Function)

According to the force sensor as the third embodiment of the present invention, the change in electrical resistance value between the end points of the first electrically conductive member 21 and the second electrically conductive member 22 can be increased, and accordingly the measurement accuracy of a component in the perpendicular direction of a force applied to the strain body 10 can be improved.

Fourth Embodiment (Structure)

Figure 10:
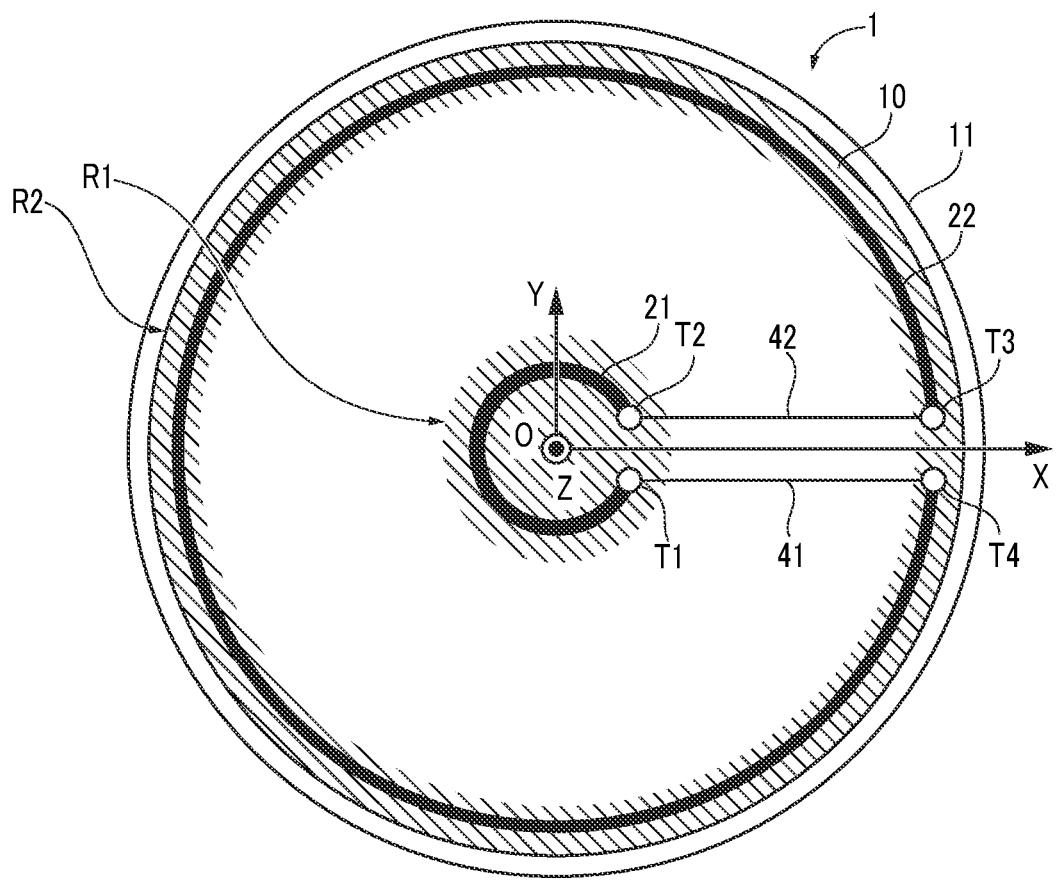
FIG. 10 is a schematic diagram showing the structure of a force sensor as a fourth embodiment of the present invention.

In a force sensor as a fourth embodiment of the present invention shown in FIG. 10, a first electrically conductive member 21 extending in a substantially annular manner around a reference point O and divided at a position is placed in a first designated latitude region R1 on a top face 101 of a strain body 10. A second electrically conductive member 22 extending in a substantially annular manner around the reference point O and divided at a position is placed in a second designated latitude region R2 on the top face 101 of the strain body 10.

The first electrically conductive member 21 is connected at one end through a terminal T1, a first conducting wire 41, and a terminal T4 in sequence to one end of the second electrically conductive member 22 and is connected at the other end through a terminal T2, a second conducting wire 42, and a terminal T3 in sequence to the other end of the second electrically conductive member 22. The second electrically conductive member 22 is connected at the other end through the terminal T3, the second conducting wire 42, and the terminal T2 in sequence to the other end of the first electrically conductive member 21 and is connected at one end through the terminal T4, the first conducting wire 41, and the terminal T1 in sequence to one end of the first electrically conductive member 21.

Figure 11A:
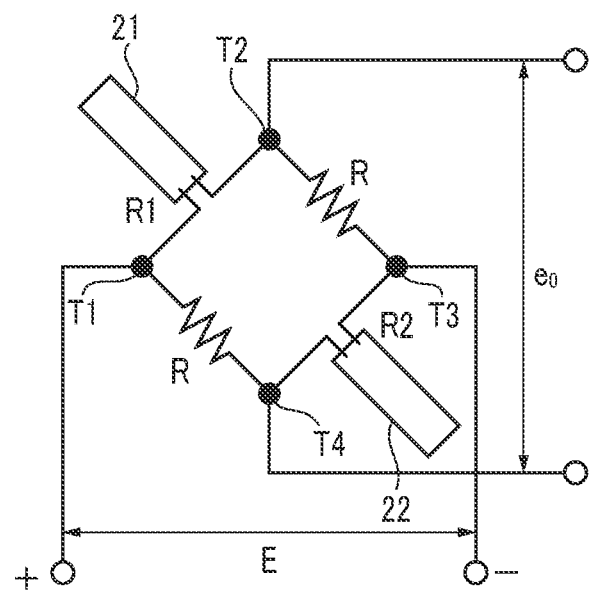
FIG. 11A is a first example diagram of a strain detection circuit in the fourth embodiment.
Figure 11B:
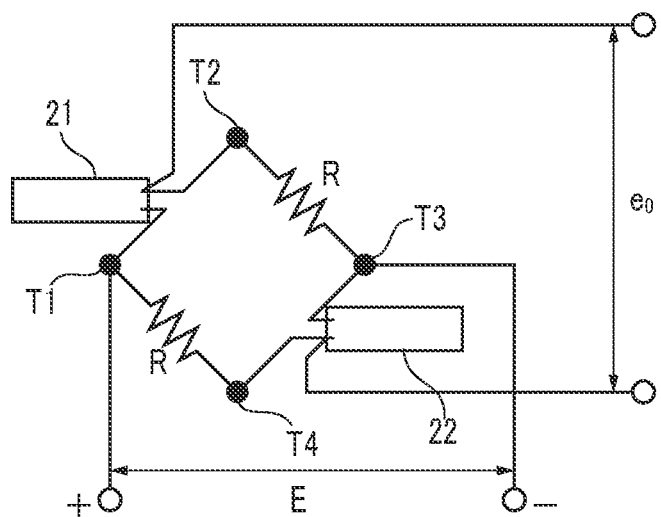
FIG. 11B is a second example diagram of the strain detection circuit in the fourth embodiment.

The conducting wires 41 and 42 form, together with the first electrically conductive member 21 and the second electrically conductive member 22, a bridge circuit in opposite two-active gauge method (2-wire) (see FIG. 11A). The conducting wires 41 and 42 may form, together with the first electrically conductive member 21 and the second electrically conductive member 22, a bridge circuit in opposite two-active gauge method (3-wire) (see FIG. 11B).

The thickness, the width, the length, and electrical properties such as electrical conductivity of each of the first electrically conductive member 21 and the second electrically conductive member 22 are appropriately designed from the viewpoint of formation of a bridge circuit (strain detection circuit). The thickness, the width, the length, and the material (determining electrical conductivity) of each of the conducting wires 41 and 42 are appropriately designed from the viewpoint of formation of the bridge circuit as with the first electrically conductive member 21 and the second electrically conductive member 22.

Except the above structure, the force sensor as the fourth embodiment of the present invention has substantially the same structure as the force sensor as the first embodiment of the present invention (see FIG. 1 and FIG. 2), and thus common components are indicated by identical signs and are not described. The first electrically conductive member 21 and the second electrically conductive member 22 are each formed from a Cr base thin film as with the electrically conductive member 20 in the first embodiment.

(Function)

According to the force sensor as the fourth embodiment of the present invention, the change in electrical resistance value between the end points of the first electrically conductive member 21 and the second electrically conductive member 22 can be increased, and accordingly the measurement accuracy of a component in the perpendicular direction of a force applied to the strain body 10 can be improved.

Fifth Embodiment (Structure)

Figure 12:
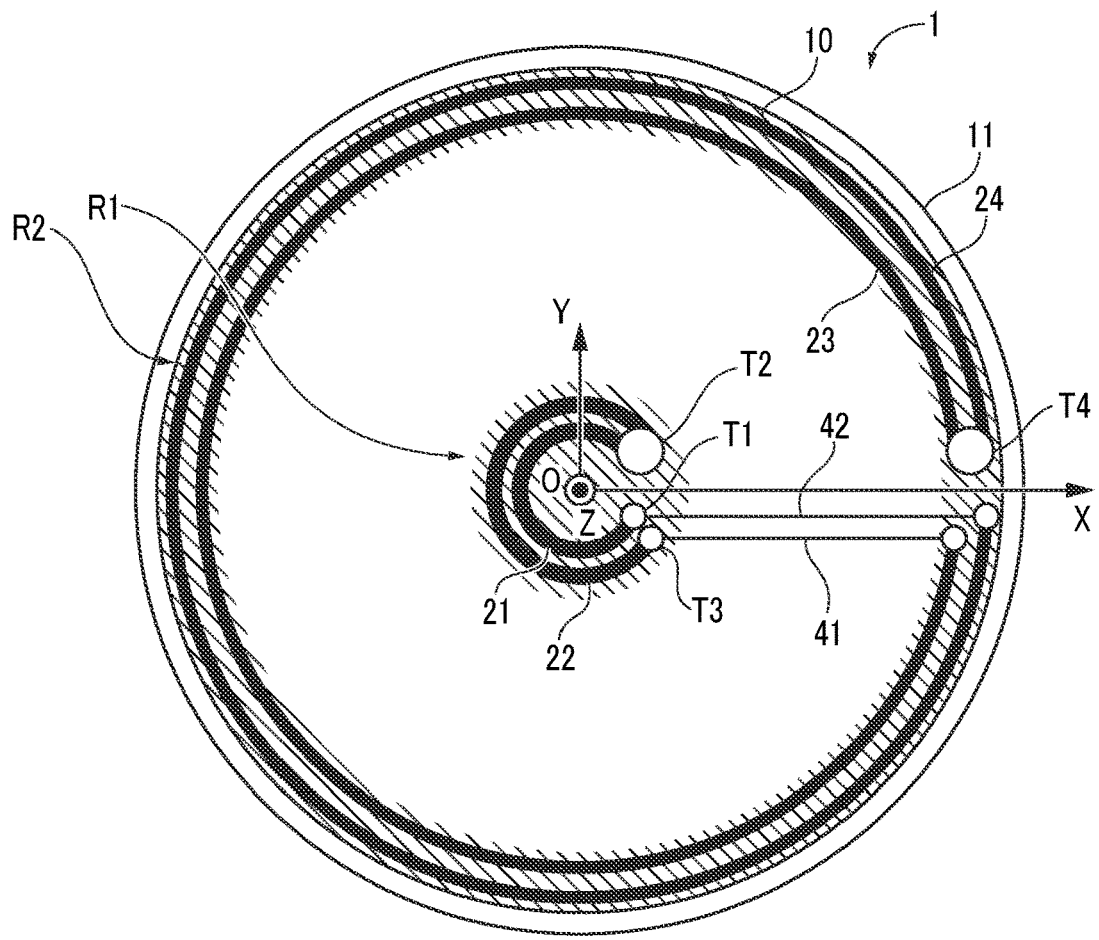
FIG. 12 is a schematic diagram showing the structure of a force sensor as a fifth embodiment of the present invention.

In a force sensor as a fifth embodiment of the present invention shown in FIG. 12, a first electrically conductive member 21 and a second electrically conductive member 22 each extending in a substantially annular manner around a reference point O and divided at a position are placed in this order from the inside in a first designated latitude region R1 on a top face 101 of a strain body 10. A third electrically conductive member 23 and a fourth electrically conductive member 24 each extending in a substantially annular manner around the reference point O and divided at a position are placed in this order from the inside in a second designated latitude region R2 on the top face 101 of the strain body 10.

The first electrically conductive member 21 is connected at one end through a terminal T1 and a second conducting wire 42 in sequence to one end of the fourth electrically conductive member 24 and is connected at the other end through a terminal T2 to the other of the second electrically conductive member 22. The second electrically conductive member 22 is connected at the other end through the terminal T2 to the other end of the first electrically conductive member 21 and is connected at one end through a terminal T3 and a first conducting wire 41 in sequence to one end of the third electrically conductive member 23. The third electrically conductive member 23 is connected at one end through the first conducting wire 41 and the terminal T3 in sequence to one end of the second electrically conductive member 22 and is connected at the other end through a terminal T4 to the other end of the fourth electrically conductive member 24. The fourth electrically conductive member 24 is connected at the other end through the terminal T4 to the other end of the third electrically conductive member 23 and is connected at one end through the second conducting wire 42 and the terminal T1 in sequence to one end of the first electrically conductive member 21.

Figure 13:
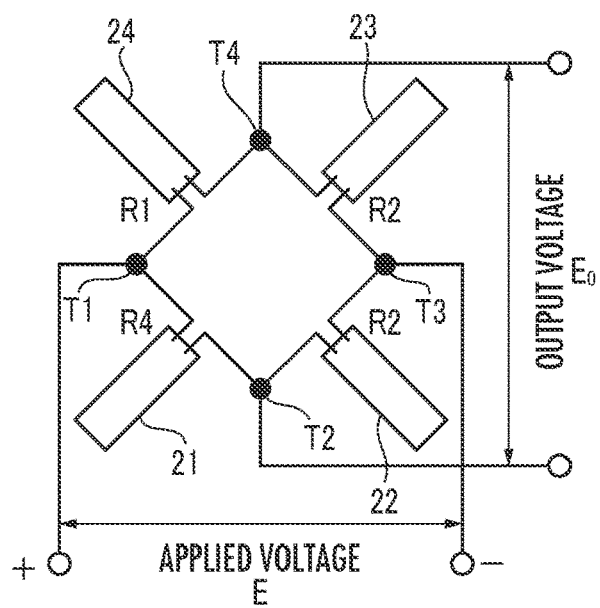
FIG. 13 is an example diagram of a strain detection circuit in the fifth embodiment.

The conducting wires 41 and 42 form, together with the electrically conductive members 21 to 24, a bridge circuit in four-active gauge method (see FIG. 13).

The thickness, the width, the length, and electrical properties such as electrical conductivity of each of the electrically conductive members 21 to 24 are appropriately designed from the viewpoint of formation of a bridge circuit (strain detection circuit). The thickness, the width, the length, and the material (determining electrical conductivity) of each of the conducting wires 41 and 42 are appropriately designed from the viewpoint of formation of the bridge circuit as with the electrically conductive members 21 to 24.

Except the above structure, the force sensor as the fifth embodiment of the present invention has substantially the same structure as the force sensor as the first embodiment of the present invention (see FIG. 1 and FIG. 2), and thus common components are indicated by identical signs and are not described. The electrically conductive members 21 to 24 are each formed from a Cr base thin film as with the electrically conductive member 20 in the first embodiment.

(Function)

According to the force sensor as the fifth embodiment of the present invention, the change in electrical resistance value between the end points of the electrically conductive members 21 to 24 can be increased, and accordingly the measurement accuracy of a component in the perpendicular direction of a force applied to the strain body 10 can be improved.

Sixth Embodiment (Structure)

Figure 14:
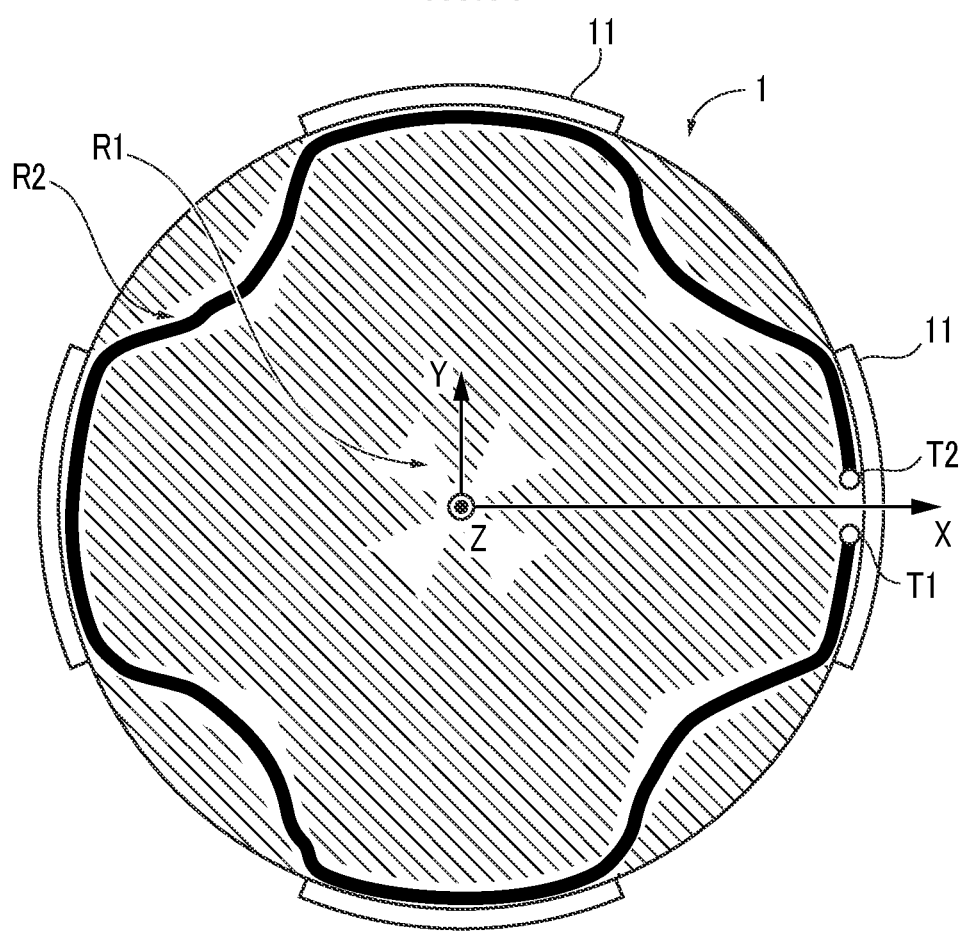
FIG. 14 is a schematic diagram showing the structure of a force sensor as a sixth embodiment of the present invention.

In a force sensor as a sixth embodiment of the present invention shown in FIG. 14, a strain body 10 includes four protrusion portions 11 each locally extending to the peripheral area thereof. The four protrusion portions 11 are placed to have four-fold symmetry about the axis (Z-axis) that is perpendicular to a top face 101 and passes through a pole O. The strain body 10 is fixed or supported in the protrusion portions 11 by a supporting portion 12. Each protrusion portion 11, for example, has a substantially sector shape having a central angle of 15° to 45°. For example, the right and left protrusion portions 11 are placed to have mirror symmetry through X-axis, and the upper and lower protrusion portions 11 are placed to have mirror symmetry through Y-axis.

Regions in the strain body 10 included in azimuth regions relative to the pole O where the strain body 10 is supported or fixed by the supporting portion 12 are defined as "restrictive direction regions", and the other regions are defined as "non-restrictive direction regions".

Figure 15:
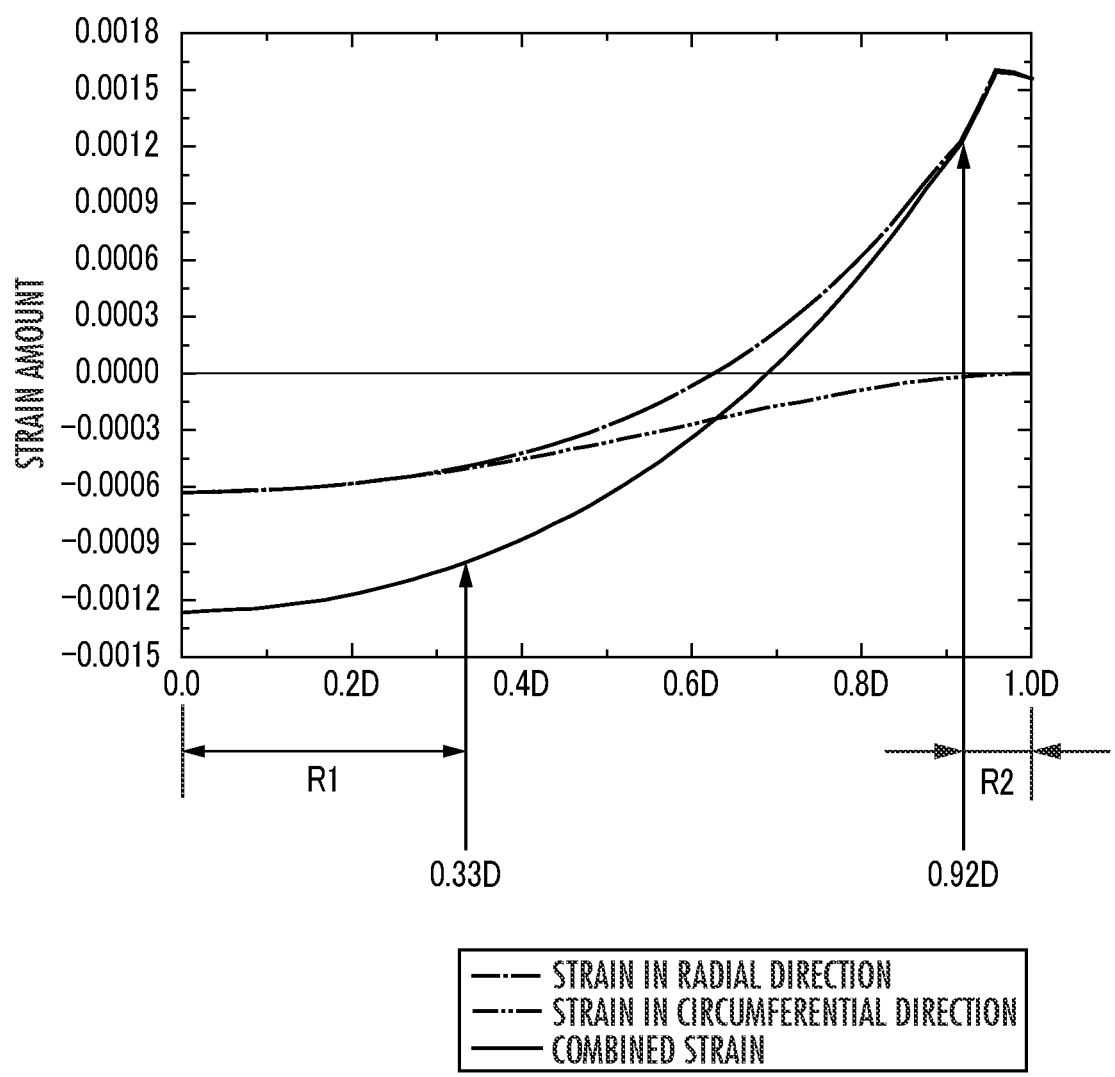
FIG. 15 is a graph of strain amount in a restrictive direction region of the strain body in the sixth embodiment.

FIG. 15 shows the calculation result of strain characteristics along the central longitude line in the "restrictive direction region" in the strain body 10 when an entirely uniform force is applied to the top face 101 of the strain body 10. A "negative" strain amount represents a shrinkage amount of the strain body 10 (exactly, the top face 101 (surface to which a stress is applied)), whereas a "positive" strain amount represents an extension amount of the strain body 10. The calculation conditions are substantially the same as in the second embodiment (see FIG. 7).

When a reference value is set at 80% of the maximum magnitude of the sum (negative value) of a first strain amount and a second strain amount, the magnitude of the sum (negative value) of strain amounts is not less than the reference value in a range not more than a distance of 0.33 D from the pole O where D is the length of the longitude line. When a reference value is set at 95% of the maximum magnitude of the sum of negative strain amounts, the magnitude of the sum (negative value) of a first strain amount and a second strain amount is not less than the reference value in a range not more than a distance of 0.17 D from the pole O.

When a reference value is set at 80% of the maximum magnitude of the sum (positive value) of a first strain amount and a second strain amount, the magnitude of the sum (positive value) of strain amounts is not less than the reference value in a range not less than a distance of 0.92 D from the pole O where D is the length of the longitude line. When a reference value is set at 95% of the maximum magnitude of the sum of positive strain amounts, the magnitude of the sum (positive value) of a first strain amount and a second strain amount is not less than the reference value in a range not less than a distance of 0.95 D from the pole O.

Figure 16:
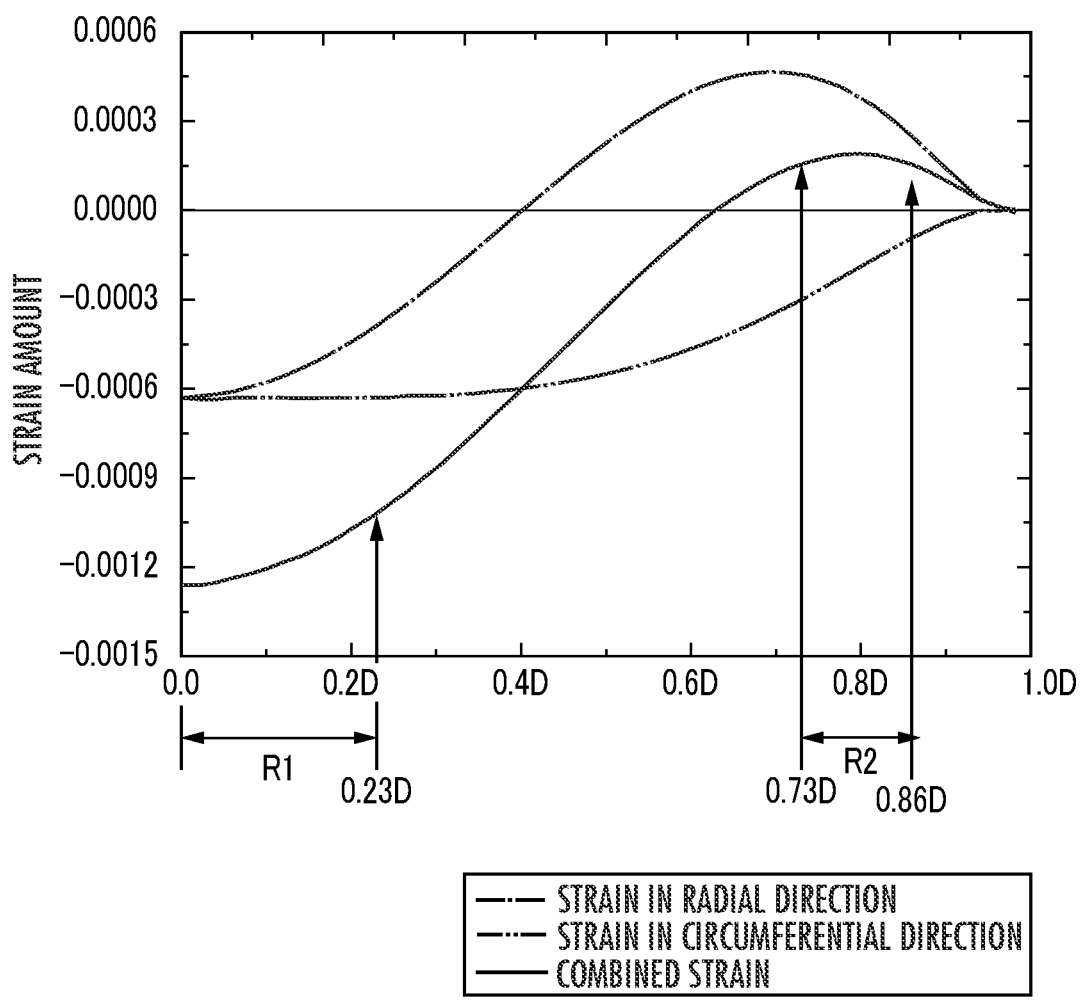
FIG. 16 is a graph of strain amount in a non-restrictive direction region of the strain body in the sixth embodiment.

FIG. 16 shows the calculation result of strain characteristics along the central longitude line in the "non-restrictive direction region" in the strain body 10 when a force is entirely applied to the top face 101 of the strain body 10. The calculation conditions are substantially the same as in the first embodiment.

When a reference value is set at 80% of the maximum magnitude of the sum (negative value) of a first strain amount and a second strain amount, the magnitude of the sum (negative value) of strain amounts is not less than the reference value in a range not more than a distance of 0.23 D from the pole O where D is the length of the longitude line. When a reference value is set at 95% of the maximum magnitude of the sum of negative strain amounts, the magnitude of the sum (negative value) of a first strain amount and a second strain amount is not less than the reference value in a range not more than a distance of 0.11 D from the pole O.

When a reference value is set at 80% of the magnitude of the maximum sum (positive value) of a first strain amount and a second strain amount, the magnitude of the sum (positive value) of strain amounts is not less than the reference value in a range of a distance of 0.73 D to 0.86 D from the pole O where D is the length of the longitude line. When a reference value is set at 95% of the maximum magnitude of the sum of positive strain amounts, the magnitude of the sum (positive value) of a first strain amount and a second strain amount is not less than the reference value in a range of a distance of 0.78 D to 0.82 D from the pole O.

FIG. 14 shows a first designated latitude region R1 and a second designated latitude region R2 in which the calculation result is reflected. The electrically conductive member 20 annularly extends and is divided at a position but, according to the shape of the second designated latitude region R2, extends in the latitude line direction relatively outside in the longitude line direction (in a range not less than a distance of about 0.92 D from the pole O) in the restrictive direction regions and extends in the latitude line direction relatively inside in the longitude line direction (in a range of a distance of about 0.73 D to 0.86 D from the pole O) in the non-restrictive direction regions.

Except the above structure, the force sensor as the sixth embodiment of the present invention has substantially the same structure as the force sensor as the first embodiment of the present invention (see FIG. 1 and FIG. 2), and thus common components are indicated by identical signs and are not described.

Seventh Embodiment (Structure)

A force sensor as a seventh embodiment of the present invention includes a substantially pillar-shaped force transfer member 30 on a top face 101 of a strain body 10 in a reference region (for example, a circular region) having the center as a pole O of the strain body 10. Except this structure, the force sensor as the seventh embodiment of the present invention has substantially the same structure as the force sensor as the sixth embodiment of the present invention (see FIG. 14), and thus common components are indicated by identical signs and are not described.

Figure 17:
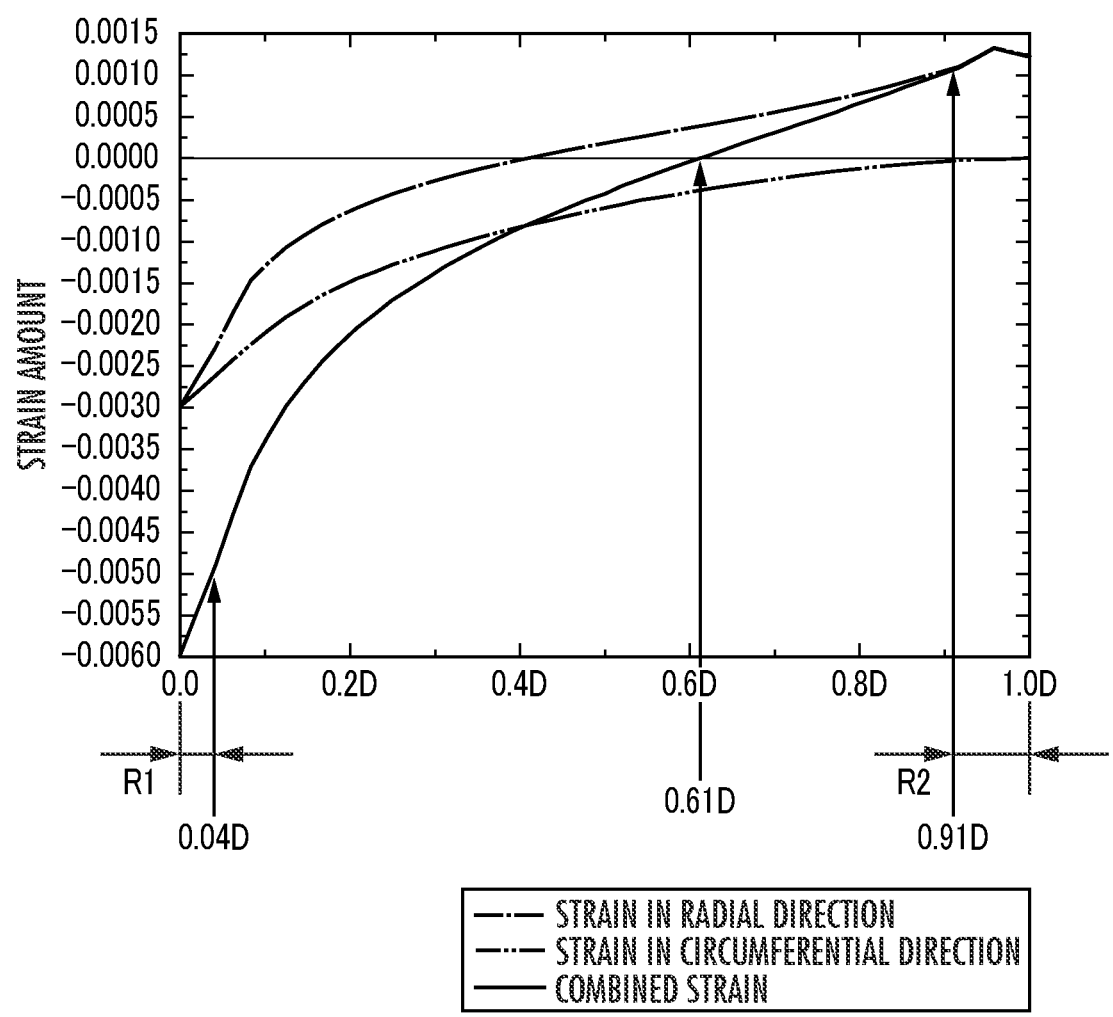
FIG. 17 is a graph of strain amount in a restrictive direction region of a strain body in a seventh embodiment.

FIG. 17 shows the calculation result of strain characteristics along the central longitude line in the "restrictive direction region" in the strain body 1 when a force is locally applied to the reference region on the top face 101 of the strain body 1. The calculation conditions are substantially the same as in the second embodiment.

When a reference value is set at 80% of the maximum magnitude of the sum (negative value) of a first strain amount and a second strain amount, the magnitude of the sum (negative value) of strain amounts is not less than the reference value in a range not more than a distance of 0.04 D from the pole O where D is the length of the longitude line. When a reference value is set at 95% of the maximum magnitude of the sum of negative strain amounts, the magnitude of the sum (negative value) of a first strain amount and a second strain amount is not less than the reference value in a range not more than a distance of 0.01 D from the pole O. When the sum of a first strain amount and a second strain amount is negative, the sum is greatly larger than when the sum of a first strain amount and a second strain amount is positive. Hence, the reference value may be set, for example, at 50% of the maximum value of positive strain amounts. This can be applied to other embodiments.

When a reference value is set at 80% of the maximum magnitude of the sum (positive value) of a first strain amount and a second strain amount, the magnitude of the sum (positive value) of strain amounts is not less than the reference value in a range not less than a distance of 0.91 D from the pole O where D is the length of the longitude line. When a reference value is set at 95% of the maximum magnitude of the sum of positive strain amounts, the magnitude of the sum (positive value) of a first strain amount and a second strain amount is not less than the reference value in a range not less than a distance of 0.94 D from the pole O.

Figure 18:
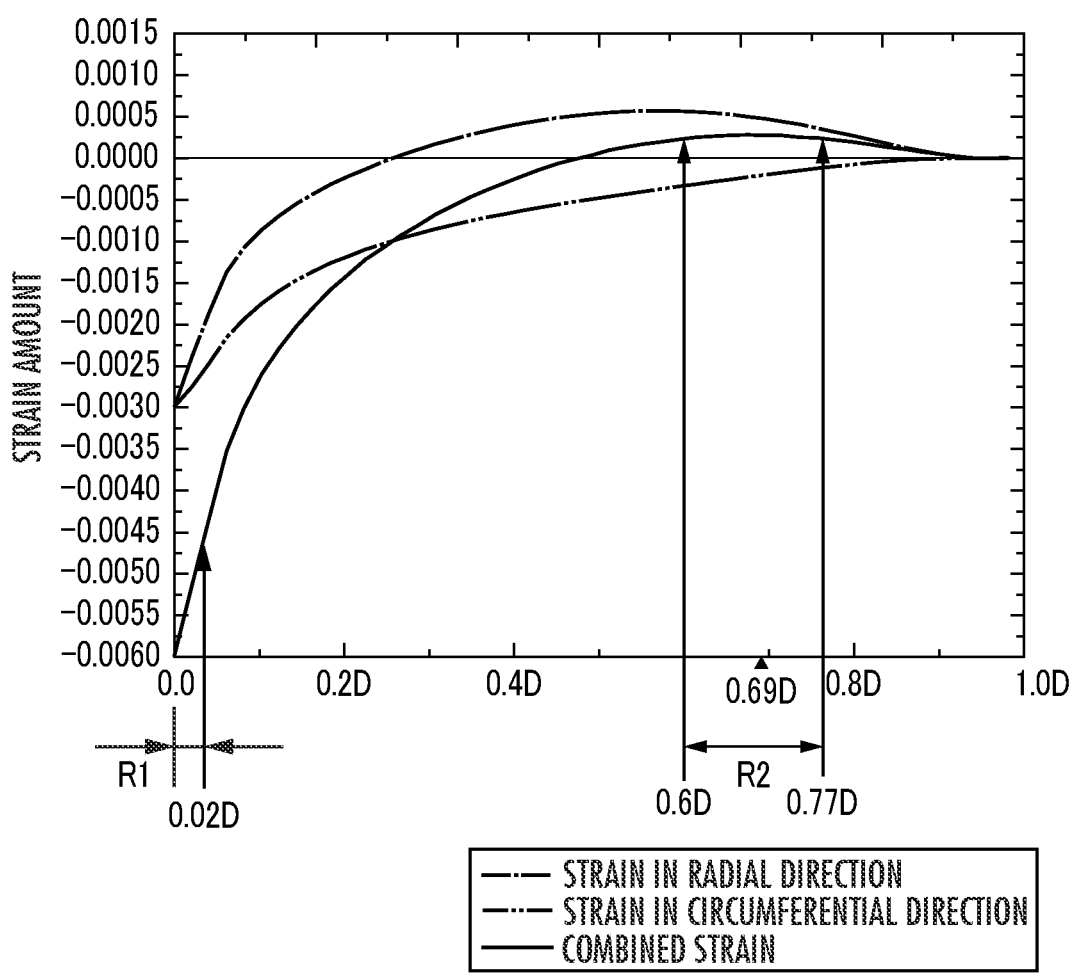
FIG. 18 is a graph of strain amount in a non-restrictive direction region of the strain body in the seventh embodiment.

FIG. 18 shows the calculation result of strain characteristics along the central longitude line in the "non-restrictive direction region" in the strain body 1 when a force is locally applied to a substantially circular reference region having the center as a reference point O of the top face 101 of the strain body 1.

When a reference value is set at 80% of the maximum magnitude of the sum (negative value) of a first strain amount and a second strain amount, the magnitude of the sum (negative value) of strain amounts is not less than the reference value in a range not more than a distance of 0.02 D from the pole O where D is the length of the longitude line. When a reference value is set at 95% of the maximum magnitude of the sum of negative strain amounts, the magnitude of the sum (negative value) of a first strain amount and a second strain amount is not less than the reference value in a range not more than a distance of 0.01 D from the pole O.

When a reference value is set at 80% of the maximum magnitude of the sum (positive value) of a first strain amount and a second strain amount, the magnitude of the sum (positive value) of strain amounts is not less than the reference value in a range of a distance of 0.60 D to 0.77 D from the pole O where D is the length of the longitude line. When a reference value is set at 95% of the maximum magnitude of the sum of positive strain amounts, the magnitude of the sum (positive value) of a first strain amount and a second strain amount is not less than the reference value in a range of a distance of 0.65 D to 0.72 D from the pole O.

The electrically conductive member 20 annularly extends and is divided at a position but, according to the shape of the second designated latitude region R2, extends in the latitude line direction relatively outside in the longitude line direction (in a range not less than a distance of about 0.91 D from the pole O) in the restrictive direction regions and extends in the latitude line direction relatively inside in the longitude line direction (in a range of a distance of about 0.60 D to 0.77 D from the pole O) in the non-restrictive direction regions.

Except the above structure, the force sensor as the seventh embodiment of the present invention has substantially the same structure as the force sensor as the sixth embodiment of the present invention (see FIG. 14), and thus common components are indicated by identical signs and are not described.

Other Embodiments of the Present Invention

In the above embodiments, all the electrically conductive members are formed on the top face 101 of the strain body 10, but as another embodiment, some electrically conductive members may be formed on the top face 101, and the remaining electrically conductive members may be formed on the bottom face 102. In this case, positive and negative signs may be inverted between a top face 101 and a bottom face 102 depending on the position of an electrically conductive member or a force application manner, and thus attention is required. In order to place a conducting wire to form a strain detection circuit, a through-hole may be provided in a strain body 10, or a conducting wire having a via structure may be buried in a strain body 10.

In the above embodiments, the strain body 10 has a substantially circular plate shape, but as another embodiment, the strain body 10 may have various shapes such as a substantially elliptical plate shape, a substantially triangular shape, a substantially rectangular plate shape, a substantially parallelogram plate shape, a substantially trapezoidal plate shape, and a substantially regular polygonal plate shape (for example, regular square, regular dodecagonal plate, or regular icosagonal plate). The strain body 10 may have a shape having rotational symmetry about the axis (for example, z-axis) that is perpendicular to the top face 101 and passes through the pole O or may have a shape without rotational symmetry. The pole O of the strain body 10 may be shifted from the center of the strain body 10.

In the sixth and the seventh embodiments, the strain body 10 is supported in a plurality of protrusion portions 11 protruding discretely by the supporting portion 12, but as another embodiment, the protrusion portions 11 may be eliminated, and the peripheral area of the strain body 10 may be directly supported by the supporting portion 12.

In the sixth and the seventh embodiments, the periphery of the strain body 10 is supported isotropically (regularly in the latitude line direction) by the supporting portion 12 (such that the restrictive direction regions have rotational symmetry about Z-axis). As another embodiment, the periphery of the strain body 10 may be irregularly supported by the supporting portion 12. For example, the periphery of the strain body 10 may be supported by a supporting portion 12 such that restrictive direction regions are defined in azimuth ranges of 340° to 20°, 40° to 80°, 120° to 180°, and 220° to 260°. In the sixth and the seventh embodiments, the periphery of the strain body 10 is supported by the supporting portion 12 at four sites, but as another embodiment, the periphery may be supported at two sites, three sites, or five or more sites.

In the sixth and the seventh embodiments, in the strain body 10, a plurality of restrictive direction regions are defined to have mirror symmetry through planes that are perpendicular to the top face 101 and passes through the pole O, and a plurality of electrically conductive members may be placed in the corresponding restrictive direction regions on the top face 101 of the strain body 10. For example, in a strain body 10, six restrictive direction regions included in six azimuth ranges of 345° to 15°, 45° to 75°, 105° to 135°, 165° to 195°, 225° to 255°, and 285° to 315° may be defined, and n pieces of electrically conductive members of 6n (n=1, 2, ...) pieces of electrically conductive members may be placed in the corresponding six restrictive direction regions on the top face 101 of the strain body 10. In this case, the six restrictive direction regions are placed to have mirror symmetry through Y-Z plane.

In the sixth and the seventh embodiments, in the strain body 10, a plurality of non-restrictive direction regions are defined to have mirror symmetry through the plane, and a plurality of electrically conductive members may be placed in the corresponding non-restrictive direction regions on the top face 101 of the strain body 10. For example, in a strain body 10, six non-restrictive direction regions included in six azimuth ranges of 15° to 45°, 75° to 105°, 135° to 165°, 195° to 225°, 255° to 285°, and 315° to 345° may be defined, and n pieces of electrically conductive members of 6n (n=1, 2, ...) pieces of electrically conductive members may be placed in the corresponding six non-restrictive direction regions on the top face 101 of the strain body 10. In this case, the six non-restrictive direction regions are placed to have mirror symmetry through Y-Z plane.

When restrictive direction regions and/or non-restrictive direction regions are placed on the top face 101 of the strain body 10 so as to have mirror symmetry through the plane, a plurality of electrically conductive members may be placed on the top face 101 of the strain body 10 so as to have mirror symmetry through the plane.

DESCRIPTION OF REFERENCE NUMERALS

10: strain body 20, 21, 22, 23, 24: electrically conductive member 30: force transfer member 41, 42, 43, 44: conducting wire 101: top face (main face) of strain body 102: bottom face (main face) of strain body O: pole R1: first designated latitude region R2: second designated latitude region

The invention claimed is:

1. A force sensor comprising:
a strain body having resiliency or elasticity;
a supporting portion supporting the strain body over an entire circumference thereof in a continuous or discrete manner; and
an electrically conductive member placed on a main face of the strain body and having an isotropic gauge factor in a direction of the main face, wherein
the electrically conductive member is placed on the main face of the strain body to annularly extend around a pole and to be divided at a position, in a designated latitude region in which a magnitude of a sum of a first strain amount in a longitude line direction of the strain body relative to the pole and a second strain amount in a latitude line direction of the strain body is not less than a predetermined value when a force greater than a threshold value having a component in a perpendicular direction to the main face is applied to the strain body.

2. The force sensor according to claim 1, wherein
the strain body has a shape having rotational symmetry about an axis that is parallel to a line perpendicular to the main face and passes through the pole or having mirror symmetry through a plane that is perpendicular to the main face and passes through the pole,
the continuous or discrete supporting manner of the strain body over a periphery by the supporting portion has rotational symmetry about the axis or has mirror symmetry through the plane, and
the electrically conductive member is placed on the main face of the strain body to have rotational symmetry about the axis or to have mirror symmetry through the plane.

3. The force sensor according to claim 1, further comprising a conducting wire that is placed on at least one main face of the strain body and forms, together with the electrically conductive member, a strain detection circuit.

4. The force sensor according to claim 1, further comprising a force transfer member that is in contact with or is attached to a reference region expanding around the pole of the strain body and is configured to transfer a force to the strain body.

5. The force sensor according to claim 1, wherein the electrically conductive member includes a Cr base thin film.

* * * * *